(12) United States Patent
Abdallah et al.

(10) Patent No.: US 9,979,709 B2
(45) Date of Patent: *May 22, 2018

(54) METHODS FOR SECURE RESTORATION OF PERSONAL IDENTITY CREDENTIALS INTO ELECTRONIC DEVICES

(71) Applicant: Apple Inc., Cupertino, CA (US)

(72) Inventors: David S. Abdallah, Charlottesville, VA (US); Barry W. Johnson, Charlottesville, VA (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/849,473

(22) Filed: Sep. 9, 2015

(65) Prior Publication Data

US 2016/0065373 A1    Mar. 3, 2016

Related U.S. Application Data

(60) Continuation of application No. 13/932,642, filed on Jul. 1, 2013, now Pat. No. 9,160,537, which is a
(Continued)

(51) Int. Cl.
  *H04L 9/32* (2006.01)
  *H04L 29/06* (2006.01)
  (Continued)

(52) U.S. Cl.
  CPC .............. *H04L 63/06* (2013.01); *G06F 21/32* (2013.01); *H04L 9/0894* (2013.01); *H04L 9/30* (2013.01);
  (Continued)

(58) Field of Classification Search
  CPC ......... H04L 63/06; H04L 9/0894; H04L 9/30; H04L 9/3247; H04L 9/3236; G06F 21/32
  See application file for complete search history.

(56) References Cited

U.S. PATENT DOCUMENTS

| 4,993,058 A | 2/1991 | Plosenke et al. |
| 5,053,608 A | 10/1991 | Senanayake |

(Continued)

FOREIGN PATENT DOCUMENTS

| JP | 2000-163031 A | 6/2000 |
| JP | 2002-73566 | 3/2002 |

(Continued)

OTHER PUBLICATIONS

International Search Report for PCT/US2003/024472 dated Nov. 20, 2003, 2 pagss.

(Continued)

*Primary Examiner* — Techane Gergiso
(74) *Attorney, Agent, or Firm* — Morrison & Foerster LLP

(57) ABSTRACT

A method and system for securely enrolling personal identity credentials into personal identification devices. The system of the invention comprises the manufacturer of the device and an enrollment authority. The manufacturer is responsible for recording serial numbers or another unique identifier for each device that it produces, along with a self-generated public key for each device. The enrollment authority is recognized by the manufacturer or another suitable institution as capable of validating an individual before enrolling him into the device. The enrollment authority maintains and operates the appropriate equipment for enrollment, and provides its approval of the enrollment. The methods described herein discuss post-manufacturing, enrollment, backup, and recovery processes for the device.

22 Claims, 5 Drawing Sheets

Related U.S. Application Data continuation of application No. 13/287,471, filed on Nov. 2, 2011, now Pat. No. 8,478,992, which is a continuation of application No. 12/190,064, filed on Aug. 12, 2008, now Pat. No. 8,055,906, which is a division of application No. 10/635,762, filed on Aug. 6, 2003, now Pat. No. 7,590,861.

(60) Provisional application No. 60/401,399, filed on Aug. 6, 2002.

(51) Int. Cl.
  *H04L 9/30* (2006.01)
  *G06F 21/32* (2013.01)
  *H04L 9/08* (2006.01)
  *G06K 9/00* (2006.01)
  *G06Q 20/40* (2012.01)

(52) U.S. Cl.
  CPC .......... *H04L 9/3231* (2013.01); *H04L 9/3247* (2013.01); *H04L 9/3263* (2013.01); *G06K 9/00885* (2013.01); *G06Q 20/40145* (2013.01); *H04L 63/0861* (2013.01)

(56) References Cited

U.S. PATENT DOCUMENTS

| | | |
|---|---|---|
| 5,131,038 A | 7/1992 | Puhl et al. |
| 5,280,527 A | 1/1994 | Gullman et al. |
| 5,469,506 A | 11/1995 | Berson et al. |
| 5,473,692 A | 12/1995 | Davis |
| 5,481,265 A | 1/1996 | Russell |
| 5,483,261 A | 1/1996 | Yasutake |
| 5,488,204 A | 1/1996 | Mead et al. |
| 5,526,428 A | 6/1996 | Arnold |
| 5,591,949 A | 1/1997 | Bernstein |
| 5,613,012 A | 3/1997 | Hoffman et al. |
| 5,615,277 A | 3/1997 | Hoffman |
| 5,659,616 A | 8/1997 | Sudia |
| 5,729,220 A | 3/1998 | Russell |
| 5,784,463 A | 7/1998 | Chen et al. |
| 5,805,719 A | 9/1998 | Pare, Jr. et al. |
| 5,825,352 A | 10/1998 | Bisset et al. |
| 5,835,079 A | 11/1998 | Shieh |
| 5,838,812 A | 11/1998 | Pare, Jr. et al. |
| 5,870,723 A | 2/1999 | Pare, Jr. et al. |
| 5,872,848 A | 2/1999 | Romney et al. |
| 5,880,411 A | 3/1999 | Gillespie et al. |
| 5,920,640 A | 7/1999 | Salatino et al. |
| 5,930,804 A | 7/1999 | Yu et al. |
| 5,952,641 A | 9/1999 | Korshun |
| 5,991,408 A | 11/1999 | Pearson et al. |
| 6,038,666 A | 3/2000 | Hsu et al. |
| 6,041,410 A | 3/2000 | Hsu et al. |
| 6,076,167 A | 6/2000 | Borza |
| 6,084,967 A | 7/2000 | Kennedy et al. |
| 6,084,968 A * | 7/2000 | Kennedy ............... G06F 21/602 380/259 |
| 6,154,879 A | 11/2000 | Pare, Jr. et al. |
| 6,167,517 A | 12/2000 | Gilchrist et al. |
| 6,181,803 B1 | 1/2001 | Davis |
| 6,182,221 B1 | 1/2001 | Hsu et al. |
| 6,185,316 B1 | 2/2001 | Buffam |
| 6,188,391 B1 | 2/2001 | Seely et al. |
| 6,201,484 B1 | 3/2001 | Russell |
| 6,202,151 B1 | 3/2001 | Musgrave et al. |
| 6,219,793 B1 | 4/2001 | Li et al. |
| 6,256,737 B1 | 7/2001 | Bianco et al. |
| 6,268,788 B1 | 7/2001 | Gray |
| 6,282,649 B1 | 8/2001 | Lambert et al. |
| 6,310,610 B1 | 10/2001 | Beaton et al. |
| 6,310,966 B1 | 10/2001 | Dulude et al. |
| 6,317,834 B1 | 11/2001 | Gennaro et al. |
| 6,323,846 B1 | 11/2001 | Westerman et al. |
| 6,353,889 B1 | 3/2002 | Hollingshead |
| 6,356,753 B1 | 3/2002 | Kolev et al. |
| 6,366,682 B1 | 4/2002 | Hoffman et al. |
| 6,367,013 B1 * | 4/2002 | Bisbee ............... G06Q 20/00 713/158 |
| 6,367,017 B1 | 4/2002 | Gray |
| 6,397,198 B1 | 5/2002 | Hoffman et al. |
| 6,446,210 B1 | 9/2002 | Borza |
| 6,466,781 B1 | 10/2002 | Bromba et al. |
| 6,484,260 B1 * | 11/2002 | Scott ............... G06F 21/32 713/182 |
| 6,487,662 B1 | 11/2002 | Kharon et al. |
| 6,490,680 B1 | 12/2002 | Scheidt et al. |
| 6,505,193 B1 | 1/2003 | Musgrave et al. |
| 6,529,885 B1 | 3/2003 | Johnson |
| 6,532,298 B1 | 3/2003 | Cambier et al. |
| 6,550,012 B1 | 4/2003 | Villa et al. |
| 6,581,161 B1 | 6/2003 | Byford |
| 6,587,945 B1 | 7/2003 | Pasieka |
| 6,601,172 B1 | 7/2003 | Epstein |
| 6,609,198 B1 | 8/2003 | Wood et al. |
| 6,615,264 B1 | 9/2003 | Stoltz et al. |
| 6,618,806 B1 | 9/2003 | Brown et al. |
| 6,636,973 B1 | 10/2003 | Novoa et al. |
| 6,657,538 B1 | 12/2003 | Ritter |
| 6,662,166 B2 | 12/2003 | Pare, Jr. et al. |
| 6,668,332 B1 | 12/2003 | McNeil |
| 6,671,808 B1 | 12/2003 | Abbott et al. |
| 6,681,034 B1 | 1/2004 | Russo |
| 6,690,387 B2 | 2/2004 | Zimmerman et al. |
| 6,719,200 B1 | 4/2004 | Wiebe |
| 6,726,881 B2 | 4/2004 | Karamchetty |
| 6,735,695 B1 | 5/2004 | Gopalakrishnan et al. |
| 6,751,734 B1 | 6/2004 | Uchida |
| 6,757,411 B2 | 6/2004 | Chau |
| 6,765,470 B2 | 7/2004 | Shinzaki |
| 6,766,040 B1 | 7/2004 | Catalano et al. |
| 6,775,776 B1 | 8/2004 | Vogt et al. |
| 6,786,397 B2 | 9/2004 | Silverbrook et al. |
| 6,816,970 B2 * | 11/2004 | Morgan ............... H04L 9/3271 380/259 |
| 6,819,219 B1 | 11/2004 | Bolle et al. |
| 6,820,202 B1 | 11/2004 | Wheeler et al. |
| 6,829,711 B1 | 12/2004 | Kwok et al. |
| 6,832,317 B1 | 12/2004 | Strongin et al. |
| 6,834,351 B1 | 12/2004 | Kabenjian |
| 6,836,765 B1 | 12/2004 | Sussman |
| 6,836,843 B2 | 12/2004 | Seroussi et al. |
| 6,839,688 B2 | 1/2005 | Drummond et al. |
| 6,844,660 B2 | 1/2005 | Scott |
| 6,846,052 B2 | 1/2005 | Hamid et al. |
| 6,850,147 B2 | 2/2005 | Prokoski et al. |
| 6,850,252 B1 | 2/2005 | Hoffberg |
| 6,853,739 B2 | 2/2005 | Kyle |
| 6,853,988 B1 | 2/2005 | Dickinson et al. |
| 6,857,073 B2 | 2/2005 | French et al. |
| 6,862,443 B2 | 3/2005 | Witte |
| 6,870,946 B1 | 3/2005 | Teng et al. |
| 6,870,966 B1 | 3/2005 | Silverbrook et al. |
| 6,871,193 B1 | 3/2005 | Campbell et al. |
| 6,871,287 B1 | 3/2005 | Ellingson |
| 6,871,784 B2 | 3/2005 | Jayaratne |
| 6,876,757 B2 | 4/2005 | Yau et al. |
| 6,877,097 B2 | 4/2005 | Hamid et al. |
| 6,879,243 B1 | 4/2005 | Booth et al. |
| 6,879,966 B1 | 4/2005 | Lapsley et al. |
| 6,880,749 B1 | 4/2005 | Green et al. |
| 6,880,750 B2 | 4/2005 | Pentel |
| 6,883,709 B2 | 4/2005 | Joseph |
| 6,886,096 B2 | 4/2005 | Appenzeller et al. |
| 6,886,101 B2 | 4/2005 | Glazer et al. |
| 6,886,104 B1 | 4/2005 | McClurg et al. |
| 6,888,445 B2 | 5/2005 | Gotfried et al. |
| 6,898,577 B1 | 5/2005 | Johnson |
| 6,901,154 B2 | 5/2005 | Dunn |
| 6,901,155 B2 | 5/2005 | Xia et al. |
| 6,901,266 B2 | 5/2005 | Henderson |
| 6,901,382 B1 | 5/2005 | Richards et al. |
| 6,914,517 B2 | 7/2005 | Kinsella |

(56) References Cited

U.S. PATENT DOCUMENTS

| | | | |
|---|---|---|---|
| 6,957,185 B1 | 10/2005 | Labaton | |
| 6,957,337 B1 | 10/2005 | Chainer et al. | |
| 6,959,382 B1 | 10/2005 | Kinnis et al. | |
| 6,963,659 B2 | 11/2005 | Tumey et al. | |
| 6,985,502 B2 | 1/2006 | Bunton | |
| 6,990,444 B2 | 1/2006 | Hind et al. | |
| 7,015,894 B2 | 3/2006 | Morohoshi | |
| 7,024,562 B1 | 4/2006 | Flink et al. | |
| 7,028,191 B2 | 4/2006 | Michener et al. | |
| 7,035,442 B2 | 4/2006 | Ha et al. | |
| 7,069,444 B2 | 6/2006 | Lowensohn et al. | |
| 7,111,173 B1 | 9/2006 | Scheidt | |
| 7,184,064 B2 | 2/2007 | Zimmerman et al. | |
| 7,287,158 B2* | 10/2007 | Futamura | H04L 9/3268 713/156 |
| 7,305,562 B1* | 12/2007 | Bianco | H04L 63/08 709/229 |
| 7,310,734 B2 | 12/2007 | Boate et al. | |
| 7,590,861 B2 | 9/2009 | Abdallah et al. | |
| 7,613,659 B1 | 11/2009 | Hoffman et al. | |
| 7,663,607 B2 | 2/2010 | Hotelling et al. | |
| 7,689,832 B2 | 3/2010 | Talmor et al. | |
| 7,788,601 B2 | 8/2010 | Abdallah et al. | |
| 8,001,372 B2 | 8/2011 | Abdallah et al. | |
| 8,055,906 B2 | 11/2011 | Abdallah et al. | |
| 8,127,143 B2 | 2/2012 | Abdallah et al. | |
| 8,407,480 B2 | 3/2013 | Abdallah et al. | |
| 8,478,992 B2 | 7/2013 | Abdallah et al. | |
| 8,479,122 B2 | 7/2013 | Hotelling et al. | |
| 8,826,031 B2 | 9/2014 | Abdallah et al. | |
| 9,160,537 B2 | 10/2015 | Abdallah et al. | |
| 9,270,464 B2 | 2/2016 | Abdallah et al. | |
| 9,716,698 B2 | 7/2017 | Abdallah et al. | |
| 2001/0001876 A1 | 5/2001 | Morgan et al. | |
| 2001/0034836 A1 | 10/2001 | Matsumoto et al. | |
| 2002/0003892 A1 | 1/2002 | Iwanaga | |
| 2002/0018585 A1 | 2/2002 | Kim | |
| 2002/0023217 A1 | 2/2002 | Wheeler et al. | |
| 2002/0025044 A1 | 2/2002 | Saito | |
| 2002/0026427 A1 | 2/2002 | Kon et al. | |
| 2002/0031230 A1 | 3/2002 | Sweet et al. | |
| 2002/0034319 A1 | 3/2002 | Tumey et al. | |
| 2002/0056043 A1 | 5/2002 | Glass | |
| 2002/0087857 A1 | 7/2002 | Tsao et al. | |
| 2002/0095586 A1 | 7/2002 | Dulude et al. | |
| 2002/0104006 A1* | 8/2002 | Boate | H04L 63/0853 713/186 |
| 2002/0104025 A1 | 8/2002 | Wrench, Jr. | |
| 2002/0129236 A1 | 9/2002 | Nuutinen | |
| 2002/0129251 A1 | 9/2002 | Itakura et al. | |
| 2002/0133716 A1 | 9/2002 | Harif | |
| 2002/0150241 A1 | 10/2002 | Scheidt et al. | |
| 2002/0174344 A1 | 11/2002 | Ting | |
| 2002/0176583 A1 | 11/2002 | Buttiker | |
| 2002/0188836 A1 | 12/2002 | Brandys | |
| 2003/0005310 A1* | 1/2003 | Shinzaki | G06F 21/32 713/186 |
| 2003/0089764 A1* | 5/2003 | Meadow | G06Q 20/341 235/375 |
| 2003/0097586 A1 | 5/2003 | Mok | |
| 2003/0101349 A1 | 5/2003 | Wang | |
| 2003/0115475 A1* | 6/2003 | Russo | G06K 9/00026 713/186 |
| 2003/0115490 A1 | 6/2003 | Russo et al. | |
| 2003/0140233 A1 | 7/2003 | Samar | |
| 2003/0200257 A1 | 10/2003 | Milgramm et al. | |
| 2003/0226015 A1 | 12/2003 | Neufeld et al. | |
| 2003/0233556 A1 | 12/2003 | Angelo et al. | |
| 2004/0015858 A1 | 1/2004 | Veil et al. | |
| 2004/0044627 A1 | 3/2004 | Russell et al. | |
| 2006/0197753 A1 | 9/2006 | Hotelling | |
| 2009/0031140 A1 | 1/2009 | Abdallah et al. | |
| 2009/0037745 A1 | 2/2009 | Abdallah et al. | |
| 2009/0037746 A1 | 2/2009 | Abdallah et al. | |
| 2013/0227299 A1 | 8/2013 | Abdallah et al. | |
| 2014/0344583 A1 | 11/2014 | Abdallah et al. | |

FOREIGN PATENT DOCUMENTS

| | | |
|---|---|---|
| JP | 2002-342033 A | 11/2002 |
| WO | WO 99/006238 | 2/1999 |
| WO | WO 99/08238 | 2/1999 |
| WO | WO 00/065770 | 11/2000 |
| WO | WO 01/41032 | 6/2001 |
| WO | WO 01/92994 A2 | 12/2001 |
| WO | WO 2004/014017 A1 | 2/2004 |

OTHER PUBLICATIONS

European Search Report for European Patent Application No. 03767206.0 dated Jul. 4, 2011, 3 pages.

Schneier, Bruce, "Applied Cryptography; Protocols, Algorithms, and Source Code in C," Second Edition, 1996, John Wiley & Sons, Inc. pp. 31-34.

Fumlko Komatsu, PKI Handbook, Japan, Soft Research Center Inc., Nov. 25, 2000, pp. 105-108.

Isobe, Y. et al., "Development of personal authentication system using fingerprint with digital signature technologies," Proceedings of the 34th Hawaii International Conference on System Sciences, Jan. 3, 2001, pp. 4039-4047

Davida, G. et al., "On Enabling secure applications through off-line biometric Identification," Security and Privacy, May 3, 1998. Proceedings of the 1998 IEEE Symposium, pp. 146-157.

English Translation of Office Action for Japanese Patent Application No. 2004-526454, dated Jul. 14, 2009, 5 pages.

English Translation of Office Action for Japanese Patent Application No. 2004-526454, dated Apr. 13, 2010, 3 pages.

Final Office Action for U.S. Appl. No. 10/635,762, dated Aug. 20, 2008, 19 pages.

Final Office Action for U.S. Appl. No. 12/190,058, dated Apr. 27, 2010, 16 pages.

Final Office Action for U.S. Appl. No. 12/190,064, dated Aug. 17, 2010, 10 pages.

Final Office Action for U.S. Appl. No. 12/190,058, dated Mar. 31, 2011, 16 pages.

Final Office Action for U.S. Appl. No. 13/932,642, dated Jan. 7, 2015, 24 pages.

Lee, S.K. et al. (Apr. 1985). "A Multi-Touch Three Dimensional Touch-Sensitive Table." *Proceedings of CHI: ACM Conference on Human Factors in Computing Systems*, pp. 21-25.

Non-Final Office Action for U.S. Appl. No. 10/635,762, dated Jul. 11, 2007, 10 pages.

Non-Final Office Action for U.S. Appl. No. 10/635,762, dated Jan. 8, 2008, 18 pages.

Non-Final Office Action for U.S. Appl. No. 12/190,061, dated Sep. 1, 2009, 5 pages.

Non-Final Office Action for U.S. Appl. No. 12/190,058, dated Sep. 2, 2009, 5 pages.

Non-Final Office Action for U.S. Appl. No. 12/190,064, dated Sep. 2, 2009, 5 pages.

Non-Final Office Action for U.S. Appl. No. 12/190,058, dated Sep. 14, 2010, 17 pages.

Non-Final Office Action for U.S. Appl. No. 12/560,254, dated Sep. 17, 2010, 12 pages.

Non-Final Office Action for U.S. Appl. No. 13/287,471, dated May 9, 2012, 5 pages.

Non-Final Office Action for U.S. Appl. No. 13/210,022, dated May 10, 2012, 16 pages.

Non-Final Office Action for U.S. Appl. No. 13/932,642, dated Jun. 6, 2014, 22 pages.

Non-Final Office Action for U.S. Appl. No. 14/445,853, dated Mar. 25, 2015, 12 pages.

Non Final Office Action for U.S. Appl. No. 14/995,081, dated Oct. 20, 2016, 23 pages.

Notice of Allowance fo U.S. Appl. No. 10/635,762, dated May 12, 2009, 9 pages.

(56) References Cited

OTHER PUBLICATIONS

Notice of Allowance for U.S. Appl. No. 12/190,061, dated Mar. 25, 2010, 13 pages.
Notice of Allowance for U.S. Appl. No. 12/560,254, dated Apr. 4, 2011, 7 pages.
Notice of Allowance for U.S. Appl. No. 12/190,064, dated Jun. 24, 2011, 12 pages.
Notice of Allowance for U.S. APpl. No. 12/190,058, dated Oct. 13, 2011, 7 pages.
Notice of Allowance for U.S. Appl. No. 13/210,022, dated Nov. 23, 2012, 2012, 8 pages.
Notice of Allowance for U.S. Appl. No. 13/287,471, dated Feb. 27, 2013. 15 pages.
Notice of Allowance for U.S. Appl. No. 13/849,985, dated Apr. 30, 2014, 9 pages.
Notice of Allowance for U.S. Appl. No. 13/932,642, dated Jun. 3, 2015, 9 pages.
Notice of Allowance for U.S. Appl. No. 14/445,853, dated Oct. 13, 2015, 5 pages.
Notice of Allowance for U.S. Appl. No. 14/995,081, dated Mar. 16, 2017, 5 pages.
Office Action for Canadian Patent Application No. 2,494,299, dated on Jul. 31, 2008, 3 pages.
Office Action for Canadian Patent Application No. 2,494,299, dated on Jul. 7, 2010, 3 pages.
Office Action for Canadian Patent Application No. 2,494,299, dated Oct. 13, 2011. 2 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestrues and Direct Manipulation," CHI '92, pp. 659-660.
Westerman, W. (Spring 1999). "Hand Tracking, Finder Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

METHODS FOR SECURE RESTORATION OF PERSONAL IDENTITY CREDENTIALS INTO ELECTRONIC DEVICES

This application is a continuation of co-pending U.S. patent application Ser. No. 13/932,642, filed Jul. 1, 2013, which is a continuation of U.S. patent application Ser. No. 13/287,471, filed Nov. 2, 2011, entitled "Methods for Secure Restoration of Personal Identity Credentials into Electronic Devices", now issued as U.S. Pat. No. 8,478,992, which is a continuation of U.S. patent application Ser. No. 12/190,064, filed Aug. 12, 2008, entitled "Methods for Secure Restoration of Personal Identity Credentials into Electronic Devices", now issued as U.S. Pat. No. 8,055,906, which is a divisional of U.S. patent application Ser. No. 10/635,762, filed Aug. 6, 2003, entitled "Methods for Secure Enrollment and Backup of Personal Identity Credentials into Electronic Devices," now issued as U.S. Pat. No. 7,590,861, which claims priority to U.S. Patent Application No. 60/401,399 filed Aug. 6, 2002 entitled, "A Secure Enrollment Process for a Biometric Personal Authentication Device", each of which is herein incorporated by reference in their entireties.

This application is related to U.S. patent application Ser. No. 12/190,058, filed Aug. 12, 2005, entitled "Methods for Secure Enrollment of Personal Identity Credentials into Electronic Devices", now issued as U.S. Pat. No. 8,127,143 and U.S. patent application Ser. No. 12/190,061, filed Aug. 12, 2008, entitled "Methods for Secure Backup of Personal Identity Credentials for Electronic Devices," now issued as U.S. Pat. No. 7,788,501; each of which is incorporated herein by reference in their entireties.

BACKGROUND OF THE INVENTION

1. Field of the Invention

This invention relates generally to the field of information security, and more particularly to an enrollment process for devices capable of storing and releasing personal identity credentials based on authentication of a human fingerprint.

2. Necessity of the Invention

Devices and applications that use biometric authentication are increasing in popularity and frequency of use in applications where information security and privacy is critical. The success rates of devices that use biometrics as a form of authorization are dependent on the accuracy of the process by which information is associated with the biometric; for example, it must not be possible for John Doe to intercept Jane Doe's enrollment process and enroll Jane Doe's credentials into a device with his fingerprint. A generalized enrollment process includes capturing a biometric sample, ensuring the legitimacy of the sample and the individual providing the sample, storing the biometric sample in the appropriate location in the device, and enabling access rights to the enrolled individual. If this enrollment process is performed incorrectly or ineffectively then the process of biometric authentication and the implicit guarantee of enhanced security are easily defeated.

A variety of portable electronic devices with biometric authentication are available to consumers. These include Hewlett Packard's iPAQ Pocket PC h5450, 3M-AiT's VeriMe, Privaris' BPID™ Security Device, and Sony's FIU-900 Puppy®. Each device is capable of storing fingerprints and performing on-board matching. Several of these products are configurable to allow use of cryptographic keys after proof of biometric identification. As discussed in the following section, ownership of cryptographic keys is typically used as a form of remote identification when individuals are communicating digitally. It is imperative, then, that the fingerprint is definitively linked to an individual, so that the cryptographic keys cannot be misused.

Furthermore, because the enrollment process must necessarily be stringent, and likely time-consuming, it is desirable to have a simple method of archiving and restoring enrolled credentials and fingerprints. Clearly the method must be inherently secure, because the entire enrollment process could be overridden by a compromise of the backup process.

DESCRIPTION OF THE RELATED ART

Public Key Infrastructure

The public key infrastructure (PKI) and digital certificates are very common and, when used correctly, can be used to guarantee a 'cryptographic identity' of an individual. The most common form of the PKI uses the RSA algorithm, which is now freely available to the public.

To use the PKI, an individual—Alice—applies for a digital certificate from as trusted authority. After a substantive background investigatory process, the trusted authority decides that Alice is who she claims to be and decides to issue a digital certificate. The certificate includes a public key, one half of an asymmetric key pair, which is assigned only to Alice. She retains the other half of the key pair, the private key. Due to the fundamental principles of public key cryptography, anything encrypted by the Alice's private key can only be decrypted using her public key, and vice versa. Alice is free to distribute the digital certificate and the public key to whomever she wishes.

When another individual, Bob, wishes to send a message to Alice, he encrypts it with her public key. Alice receives the encrypted message and uses her private key to decrypt it. Because Alice is the unique owner of her public key, Bob knows that she possesses the unique and accompanying private key. Additionally, Bob sees that a trusted authority, which he knows performs substantive background checks, issued the digital certificate issued to Alice. He is assured that the only person who can read the message is truly Alice. This assures one-way security.

However, Alice cannot be sure that Bob sent her the message, because her public key is freely accessible. To combat this problem, Bob also requests and receives a digital certificate from a trusted authority. Bob writes his message and then creates a digital signature for the message. He first creates a hash of the message; this process creates a fixed-length string that is unique to the message but cannot be used to deduce the message. He then encrypts this hash using his private key and appends the encrypted hash to his message. The message and encrypted hash are now encrypted with Alice's public key, and transmitted to her.

Alice first decrypts the message with her private key. She can now read the message, as described above. However, she also has the encrypted hash, which she can use to verify that Bob sent the message. She uses Bob's public key to decrypt the digital signature and obtain the hash. Alice then hashes the received message herself, using the same hash algorithm as Bob. If she obtains the same hash value as the one transmitted by Bob, she is assured that the message has not changed, and that he did actually send the message.

Enrollment Processes

3M-AiT's VeriMe stores a biometric template and a cryptographic private key for one user. When the user wishes to use the cryptographic private key, he or she must supply the correct biometric template. According to the VeriMe fact sheet, the private key is generated at the time of "secure registration" of the fingerprint. However, the fact sheet does not describe the secure registration or what it entails; it also does not discuss a secure backup and recovery process.

Biometric Associates (BAI) produces a fingerprint sensor that can be embedded into a smartcard. The smartcard can then be used to perform local biometric authentication, like the devices described above. According to BAI'S website, the cards can enroll up to eight users with the use of a BAI Enrollment Station. The Enrollment Station provides external equipment necessary to instruct the smartcard to start enrolling fingerprints and personal credentials. However, the published information does not describe a secure cryptographic process for accomplishing this. It also does not describe secure backup and recovery processes.

BRIEF SUMMARY OF THE INVENTION

The invention disclosed herein describes processes for securely enrolling personal identity credentials into devices with means for personal identification. For example, a handheld computer with a biometric sensor may use enrolled fingerprints to identify as user when he requests access to stored information. The enrollment of the fingerprint must tie the user definitively to the fingerprint so that future authorizations are valid.

The invention described herein provides a process for enrollment wherein a manufacturer of a personal identification device records serial numbers or another unique identifier for each device that it produces, along with a self-generated public key for each device. An enrollment authority is recognized by the manufacturer or another suitable institution as capable of validating an individual before enrolling him into the device—maintains and operates the appropriate equipment for enrollment, and provides its approval of the enrollment. In some embodiments, a biometric personal identification device (BPID) is verified that it is a legitimate device and that it has not been previously enrolled to another individual.

The BPID is an electronic, secure personal identification apparatus for which the present invention describes enrollment techniques. The security features that it offers, including integration with the public key infrastructure and local-only storage of the biometric, guarantee that the processor has authorized the dissemination of personal information.

The methods described herein are directed to post-manufacturing processes for the device, as well as the enrollment itself. Additionally, the invention describes methods for securely archiving enrolled personal identity credentials. This is to allow users to restore previously validated credentials into a new device without requiring a completely new enrollment. Correspondingly, the invention describes the restoration process, in which the stored credentials are securely downloaded into the new device.

BRIEF DESCRIPTION OF DRAWINGS

FIG. 1 is a flow chart illustrating the post-manufacturing process for a personal identification device.

FIG. 2 is a flow chart illustrating the process for enrolling personal identity credentials into the personal identification device.

FIG. 3 is a flow chart illustrating the backup process for securely storing personal identity credentials for future restoration.

FIG. 4 is a flow chart illustrating the restoration process.

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention.

The invention disclosed herein provides a process for securely enrolling individuals into devices with means for personal identification via use of biometric authentication (hereafter referred to as 'personal identification devices'). Because these devices are intended for use as trusted authentication devices, it is imperative that all of the information stored within the device be placed there in such a manner that it cannot be altered without proper authorization. There are two participants in the enrollment process, the manufacturer of the personal identification device and an enrollment authority.

The enrollment process includes identifying the device post-manufacturing and enrolling personal identity credentials and an associated biometric into the personal identification device. Furthermore, the invention also discloses methods for creating secure backup and recovery processes, such that an individual may securely store the enrolled information in an electronic storage repository, such as a hard drive. If his personal identification device fails he can use the recovery process to transfer the stored, enrolled information to a new device.

The two participants in the enrollment process must be definitely and separately identified for proper enrollment. The first participant in the enrollment system is the manufacturer of the personal identification device. The manufacturer is responsible for maintaining a database of unique identifiers, such as serial numbers, for all of the devices that it produces. This enables it later to determine if it manufactured a particular device. The second party is an enrollment authority, which is responsible for investigating, authorizing and performing individuals' requests for enrollment into a personal identification device. This participant may be a Department of Motor Vehicles, a building security officer, or any other person or organization responsible for issuing personal identification devices.

Initial Enrollment

This enrollment system uses the PKI described above. Each manufacturer and enrollment authority is provided with at least one asymmetric key pair that can be used for identification and encryption. The key pairs may be self generated, but the public key for each must be placed in a digital certificate signed by a trusted authority. Additionally, the manufacturer may wish to sign digital certificates owned by the enrollment authority as means for guaranteeing its approval of the enrollment authority.

Figure 1:
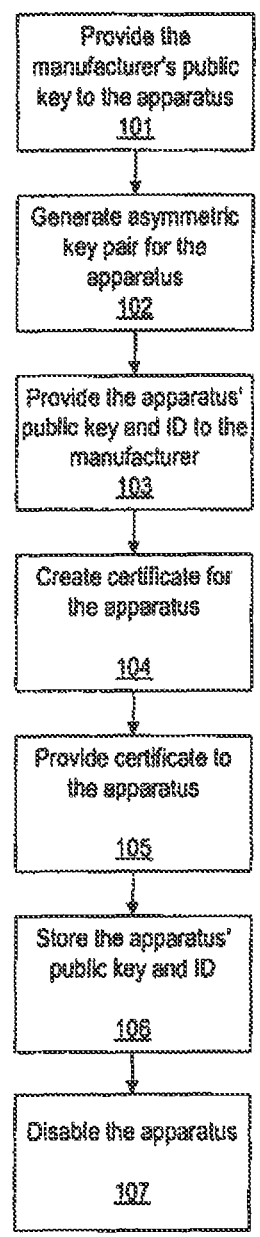
FIG. 1: Post-manufacturing process
101 Provide manufacturer's public key to device
102 Generate key pair for device
103 Provide device's public key and unique ID to manufacturer
104 Create digital certificate for device
105 Provide digital certificate to device
106 Store device's public key and unique ID
107 Disable device

FIG. 1 demonstrates the post-manufacturing process that begins the enrollment process for a personal identification device. Immediately following manufacturing, each personal identification device receives a public key possessed by its manufacturer (step 101). In the preferred embodiment this key is received as part of a digital certificate. The personal identification device can use this public key to verify the digital signature on messages transmitted from the manufacturer and accept them as legitimate instructions. This step requires that the manufacturing process be secure and tamper-resistant; receiving a key other than a trusted manufacturer's would directly compromise future security verifications.

The personal identification device now generates an asymmetric key pair for itself (step 102). The public key and the device's unique identifier are sent to the manufacturer (step 103). The manufacturer, or other legitimate certificate authority, generates a digital certificate for the device (step 104). This is now sent back to the device, and can be signed by the manufacturer as a token of its legitimacy (step 105). The manufacturer keeps a record of the device's public key and its unique identifier for future reference (step 106). At this point all functionality within the personal identification device is disabled, such that it is in a state waiting for future enrollment (step 107).

Figure 2:
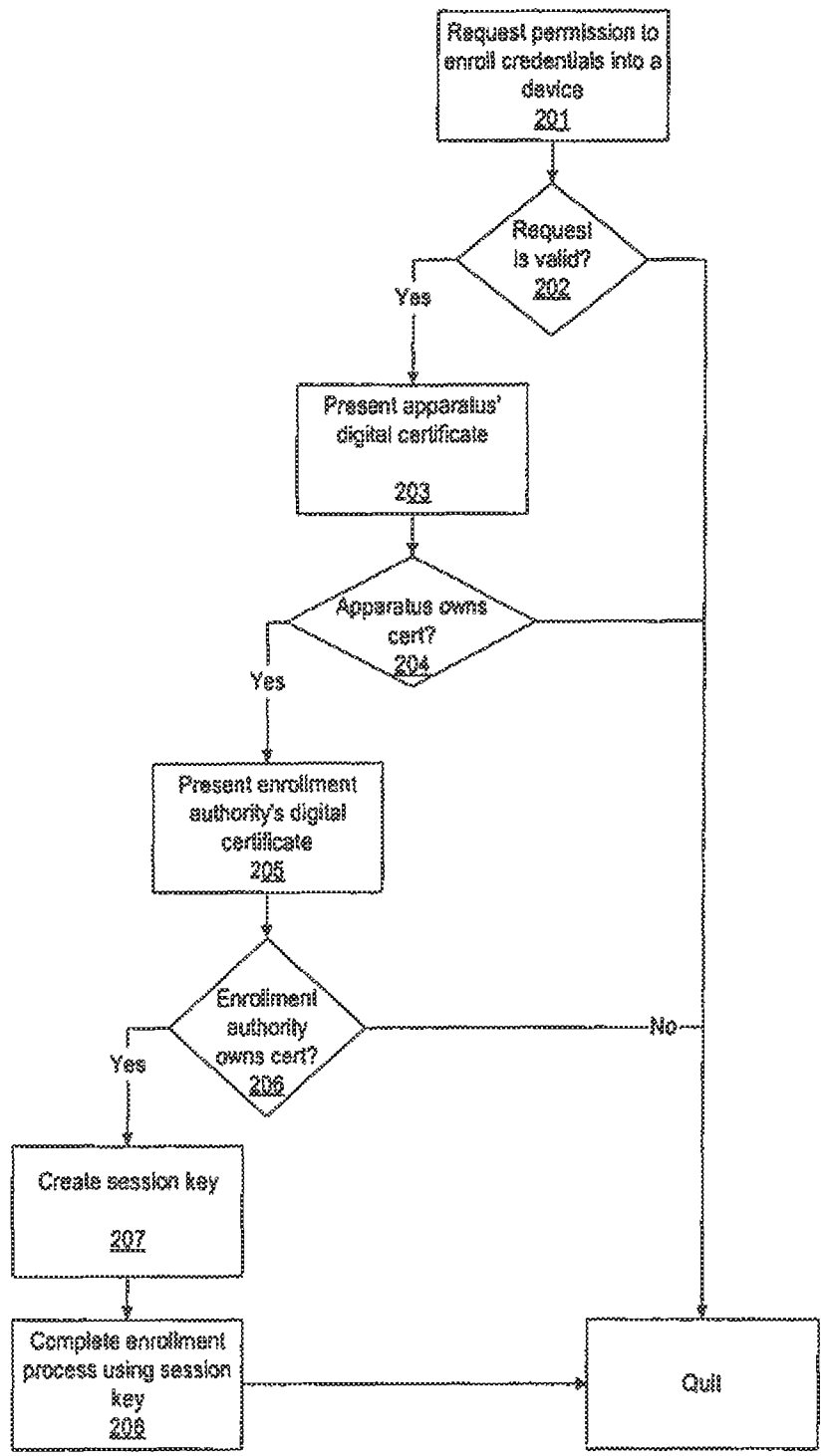
FIG. 2: Enrollment
201 Request permission from enrollment authority to enroll credentials into device
202 Validate the request
203 Present device's digital certificate
204 Verify that device is true owner of the certificate
205 Present enrollment authority's digital certificate
206 Verify that enrollment authority is true owner of the certificate
207 Create a session key
208 Complete enrollment, encrypting with the session key

As seen in FIG. 2, upon receipt of a personal identification device, an individual requests enrollment rights from an enrollment authority (step 201). This may require that the individual be physically present in a specified location, or may be performed remotely. The enrollment authority may establish all rules pertaining to the applicant verification process. The security and authenticity of the personal identification device is only as good as that of the verification process, so it is anticipated that these processes will be as stringent as required by the end application.

After approving the applicant, the enrollment authority receives the personal identification device's digital certificate (steps 202 and 203). The enrollment authority validates the digital certificate by prompting the device to encrypt a predetermined string with its private key (step 204). The enrollment authority now decrypts the encrypted string using the public key stored in the device' digital certificate, and verifies that the decrypted string matches the predetermined string. At this point the personal identification device will receive and verify the validity of the enrollment authority's digital certificate (steps 206 and 206). It performs the same prompt and verification process described above, and can also verify the manufacturer's signature on the certificate if one exists. After confirming the legitimacy of the enrollment authority, the personal identification device creates a session key, encrypts the session key and securely releases it to the enrollment authority (step 207). The personal identification device and the enrollment authority can now communicate freely using the session key (step 208). The biometric may be downloaded into the personal identification device along with the personal identity credentials, or may alternatively be sensed locally using the device and stored locally. The enrollment process, at this stage, is application-dependent and requires the establishment of requisite credentials, etc., which are not covered within the scope of this invention.

Restoration Processes

It may be necessary in some cases to provide a backup of at least one enrolled personal identity credential and biometric. The backup may be used in the event that the personal identification device fails, such that the individual may re-enroll a new personal identification device without undergoing the entire process described above; these devices are referred to as the 'primary personal identification device' and the 'secondary personal identification device,' respectively.

Backup

There are two distinct parts of the restoration process. The first part describes a method for archiving the enrolled personal identity credential, which allows an enrolled individual to securely store his personal identity credential and biometric to a user-accessible computer disk or other electronic storage repository. This data is only accessible with permission from a device manufacturer, an enrollment authority, or a recovery authority, as specified by the implementer of the system. In the primary embodiment, this system controller will be the manufacturer of the primary personal identification device. The second part of the restoration process describes a method for restoring the stored data to the secondary personal identification device.

Figure 3:
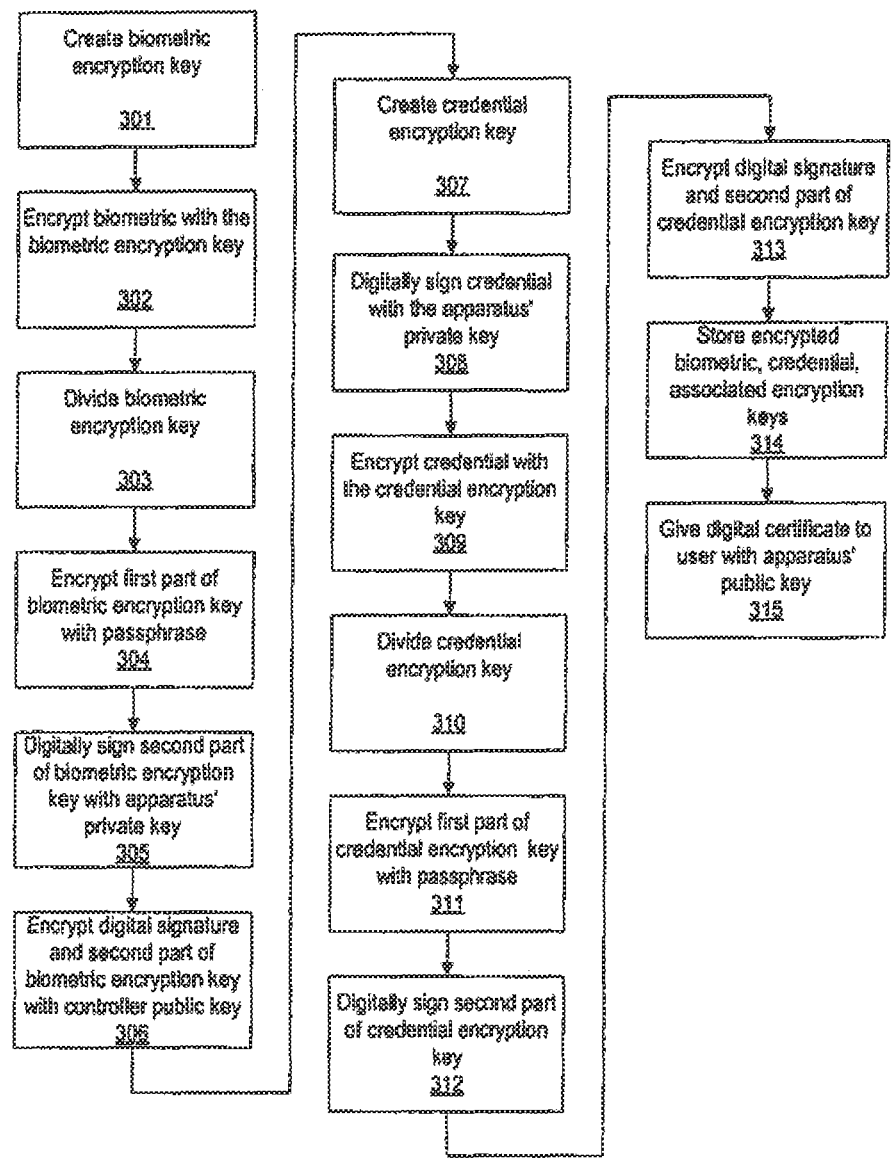
FIG. 3: Backup
301 Create symmetric biometric encryption and decryption key
302 Encrypt the biometric with the symmetric biometric encryption and decryption key
303 Divide the symmetric biometric encryption and decryption key into two parts
304 Encrypt first part with a passphrase
305 Digitally sign second part with primary device's private key
306 Encrypt digital signature and second part of symmetric biometric encryption and decryption key with the controller's public key
307 Create symmetric personal identity credential encryption and decryption key
308 Digitally sign personal identity credential with primary device's private key
309 Encrypt credential with symmetric personal identity credential encryption and decryption key
310 Divide symmetric personal identity credential encryption and decryption key
311 Encrypt first part of symmetric personal identity credential encryption and decryption key with passphrase
312 Digitally sign second part of symmetric personal identity credential encryption and decryption key with primary device's private key
313 Encrypt digital signature and second part of symmetric personal identity credential encryption and decryption key with controller's public key
314 Store the encrypted biometric, encrypted credentials, and encrypted symmetric biometric encryption and decryption key and symmetric personal identity credential encryption and decryption key in an electronic storage repository
315 Provide user with a digital certificate containing the primary devices public key

As seen in FIG. 3, the primary personal identification device generates a symmetric biometric encryption and decryption key (step 301). This key is used for encrypting a digital representation of the enrolled biometric (step 302), which can be used to unlock the archived personal identity credential(s). After encryption of the biometric, the symmetric biometric encryption and decryption key is divided into two unique and distinct parts (step 303); the scheme of separation may be selected at the discretion of the system implementer. The first part of the symmetric biometric encryption and decryption key is encrypted with a user-selected passphrase (step 304). The second part of the symmetric biometric encryption and decryption key is signed by a private key possessed by the primary personal identification device (step 305), and is then encrypted with a public key owned by the system controller (step 306). As described above, in this embodiment the system controller is the primary personal identification device manufacturer. Using the manufacturer's public key forces an individual to request restoration privileges from the manufacturer during restoration, because the individual needs the manufacturer to decrypt the data with its private key. This is discussed in further detail below.

The primary personal identification device then generates a symmetric personal identity credential encryption and decryption key (step 307), which is used for encrypting at least one enrolled personal identity credential. The primary personal identification device first digitally signs the personal identity credential, using a private key (step 308), and then encrypts the personal identity credential and associated digital signature (step 309). Similarly to the scheme described above, the symmetric personal identity credential encryption and decryption key is divided (step 310) into two unique and distinct parts. The first part is encrypted with a user-selected passphrase (step 311), which may or may not be the same passphrase as used above. The second part is again signed by the device' private key (step 312) and encrypted with the manufacturer's public key (step 313).

All of the encrypted and/or signed data—the biometric, the symmetric biometric encryption and decryption key, the personal identity credential, and the symmetric personal identity credential encryption and decryption key—are now stored in an electronic storage repository (step 314). In typical embodiments the electronic storage repository could be a computer hard drive, floppy disk, or network drive. The primary personal identification device releases its digital certificate to the individual for future use of its public key (step 315).

Restoration

Figure 4:
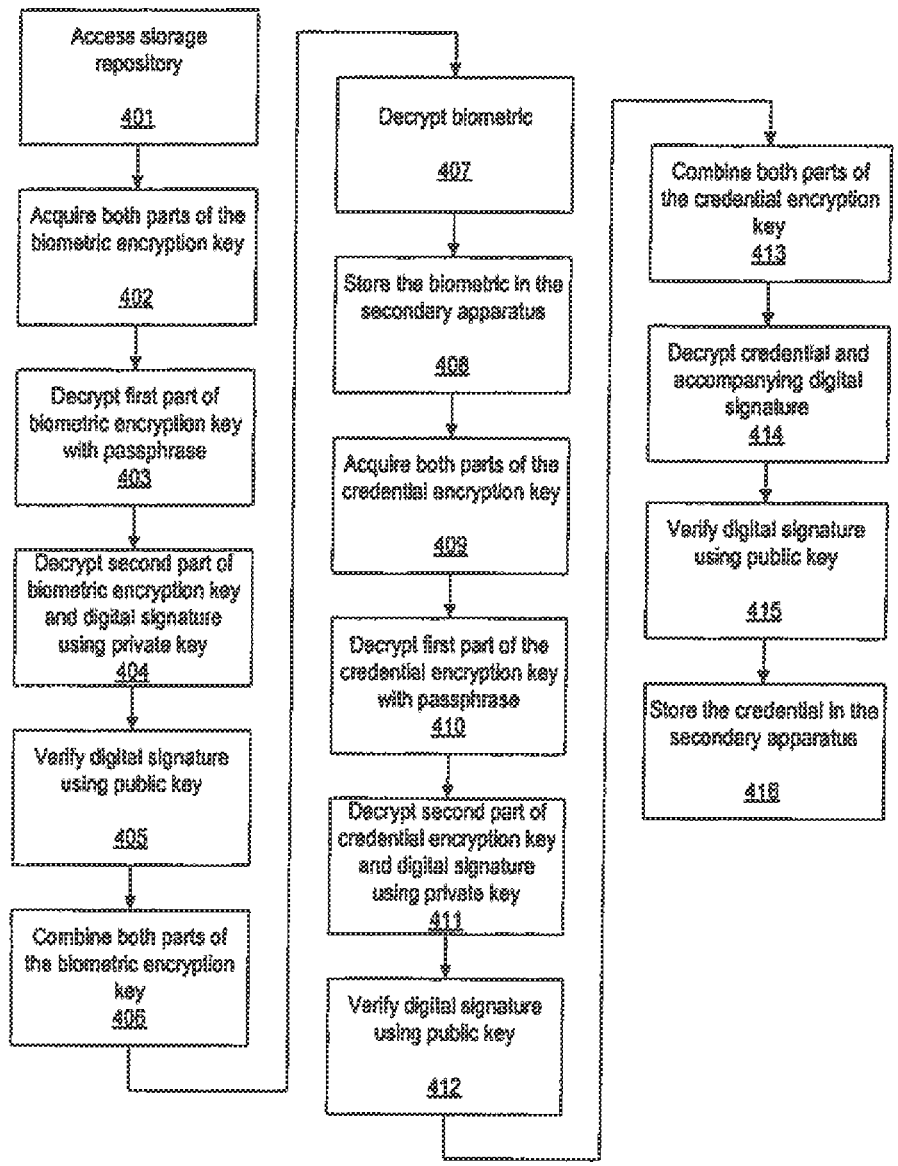
FIG. 4: Restoration
401 Access the electronic storage repository
402 Obtain both parts of the symmetric biometric encryption and decryption key
403 Decrypt the first part with a passphrase
404 Decrypt the second part and the digital signature with the controllers private key
405 Verify the digital signature using the primary device's public key
406 Combine both parts of the symmetric biometric encryption and decryption key
407 Decrypt the biometric
408 Store the biometric in the secondary device
409 Obtain both parts of the symmetric personal identity credential encryption and decryption key
410 Decrypt the first part with a passphrase
411 Decrypt the second part and the digital signature with the controller's private key
412 Verify the digital signature using the primary device's public key
413 Combine both parts of the symmetric personal identity credential encryption and decryption key 414 Decrypt the personal identity credential and the associated digital signature 415 Verify the digital signature using the primary device's public key 416 Store the personal identity credential in the secondary device

As seen in FIG. 4, when an individual receives a secondary personal identification device, and wishes to restore data from a primary personal identification device, he must access the electronic storage repository (step 401). The individual must first acquire the two encrypted and/or signed parts of the symmetric biometric encryption and decryption key (step 402). The secondary personal identification device decrypts the first part of the symmetric biometric encryption and decryption key with the user's passphrase (step 403). It then requests the system controller, the manufacturer of the primary personal identification device, to decrypt the second part of the symmetric biometric encryption and decryption key and the associated digital signature using its (the manufacturer's) private key (step 404). Once the data has been decrypted, the secondary personal identification device verifies the digital signature using a public key possessed by the primary personal identification device (step 405). The two parts of the symmetric biometric encryption and decryption key are now combined appropriately (step 406), and can be used to decrypt the biometric (step 407). The biometric is now stored in an appropriate location within the secondary personal identification device (step 408).

The individual now obtains the two encrypted and/or signed parts of the symmetric personal identity credential encryption and decryption key (step 409). Similarly to the process described above, the secondary personal identification device decrypts the first part of the symmetric personal identity credential encryption and decryption key using a user-selected passphrase (step 410). It now requests the system controller, the manufacturer of the primary personal identification device, to decrypt the second part of the symmetric personal identity credential encryption and decryption key and the accompanying digital signature using its private key (step 411). Again, the secondary personal identification device verifies the digital signature using a public key possessed by the primary personal identification device (step 412). The two parts of the key are reconstructed to form one key (step 413). The key is now used to decrypt the personal identity credential and the associated digital signature (step 414), and the signature is verified using a public key owned by the primary personal identification device (step 415). The decrypted personal identity credential can now be stored appropriately within the secondary personal identification device (step 416).

Figure 5:
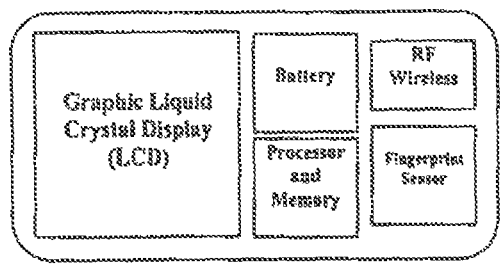
FIG. 5 illustrates components of a biometric personal identification device (BPID), according to an embodiment of the invention.

FIG. 5 illustrates the components of the BPID, according to an embodiment of the invention. As shown in FIG. 5, the components of the BPID include a processor, a memory, an RF wireless transceiver, a fingerprint sensor, a battery and a graphic liquid crystal display (LCD).

A BPID is a handheld electronic device that provides multi-factor authentication and allows its registered and/or enrolled owner to control the release and dissemination of stored information such as financial accounts, medical records, passwords, personal identification numbers, and other sensitive data and information. The device has tamper-resistant packaging with from factors ranging from credit card size to key fobs, and further includes a fingerprint scanner. Although those familiar in the art will recognize that this device's biometrics can be interchanged with another biometric technology, it can be observed that Russell's BPID patent application additionally includes a liquid crystal display (LCD) and buttons for user interaction, a wireless interface for communicating with other electronic devices, and a self-generated public key/private key pair for digitally signing data. The device has been developed so that the fingerprint cannot be physically or electronically removed or transmitted from the device, and information cannot be physically or electronically removed or transmitted from the device unless released by the owner of the authorizing fingerprint. All data and processing is performed securely.

The BPID can store and run multiple applications, allowing an individual to store a variety of personal information, although it is important to note that the applications are fully independent and cannot affect other applications' data. Many of these applications require the owner to transmit information to a terminal; for example, the BPID may wirelessly transmit financial account information to a cash register during an in-store purchase. In order to make the transaction secure, the BPID uses its private key to create a digital signature on all information that the individual chooses to release. Recipients of information from the BPID use the encrypted digital signature and a database of public keys to confirm that the information came from a specific device and that the information has not been altered. If it is desired by, e.g., a driver license verification application and/or other independent applications, the BPID can encrypt all transmitted data and information so that only the intended recipient can decode the information. The BPID places the control of personal and private information in the hands of the individual that owns the information and the organization that issues the device and/or creates device applications.

Figure 6:
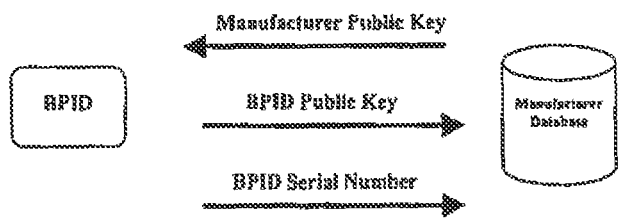
FIG. 6 is a system diagram illustrating transactions between the BPID of FIG. 5 and a manufacturer database, according to an embodiment of the invention.

FIG. 6 is a system diagram illustrating transactions between the BPID of FIG. 5 and a manufacturer database, according to an embodiment of the invention. The BPID can receive from the manufacturer database the manufacturer public key. The BPID can generate an asymmetric key pair and release/send the BPID public key to the manufacturer database, who issues and signs a certificate for the BPID. The manufacturer database can download the certificate and public key of the manufacturer to the BPID. The BPID can receive from the manufacturer database the BPID serial number.

Figure 7:
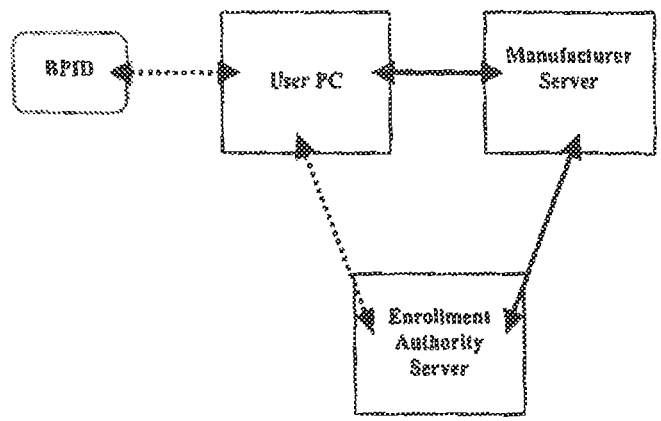
FIG. 7 is a system including the BPID of FIG. 5 illustrating communication channels for the enrollment process, according to an embodiment of the invention.

FIG. 7 is a system including the BPID of FIG. 5 illustrating communication channels for the enrollment process, according to an embodiment of the invention. The system includes the BPID, a user's personal computer (PC), a manufacturer server and an enrollment authority server. The user's PC can communicate with the BPID, the manufacturer server and the enrollment authority server. The enrollment authority server can communicate with the manufacturer server.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A computer-implemented method, comprising:
    receiving, by a personal identification device, a signature associated with a biometric encryption key from a party, the signature having been decrypted by the party based on a private key associated with the party, wherein the biometric encryption key was previously split into a first section and a second section, the first section and second sections each encrypted using a different key;
    verifying, by the personal identification device, a validity of the signature based on a public key associated with a first personal identification device;
    decrypting, by the personal identification device, the encrypted first and second sections of the biometric encryption key; and
    combining, by the personal identification device, the decrypted first section of the biometric encryption key and the decrypted second section of the biometric encryption key to restore the biometric encryption key when the validity of the signature is verified.

2. The computer-implemented method of claim 1, wherein the second section of the biometric encryption key was decrypted by the party using the private key associated with the party.

3. The computer-implemented method of claim 1, wherein the first section of the biometric encryption key was decrypted using a passcode entered by a user.

4. The computer-implemented method of claim 3, wherein the passcode was entered by the user on a second personal identification device.

5. The computer-implemented method of claim 1, further comprising:
    decrypting, by a second personal identification device, biometric data associated with the first personal identification device.

6. The computer-implemented method of claim 5, further comprising:
    receiving the biometric data associated with the first personal identification device from one of: the party, an electronic storage repository, or a persistent storage medium.

7. The computer-implemented method of claim 5, further comprising:
    storing the biometric data associated with the first personal identification device in the second personal identification device.

8. The method of claim 1, wherein the personal identification is one of the first personal identification device, or a second personal identification device.

9. A non-transitory computer-readable medium programmed with executable instructions that, when executed by a processing system comprising at least one hardware processor, perform operations comprising:
    receiving, by a personal identification device, a signature associated with a biometric encryption key from a party, the signature having been decrypted by the party based on a private key associated with the party, wherein the biometric encryption key was previously split into a first section and a second section, the first section and second sections each encrypted using a different key;
    verifying, by the personal identification device, a validity of the signature based on a public key associated with a first personal identification device;
    decrypting, by the personal identification device, the encrypted first and second sections of the biometric encryption key; and
    combining, by the personal identification device, the decrypted first section of the biometric encryption key and the decrypted second section of the biometric encryption key to restore the biometric encryption key when the validity of the signature is verified.

10. The non-transitory computer-readable medium of claim 9, wherein the second section of the biometric encryption key was decrypted by the party using the private key associated with the party.

11. The non-transitory computer-readable medium of claim 9, wherein the first section of the biometric encryption key was decrypted using a passcode entered by a user.

12. The non-transitory computer-readable medium of claim 11, wherein the passcode was entered by the user on a second personal identification device.

13. The non-transitory computer-readable medium of claim 9, the operations further comprising:
   decrypting, by a second personal identification device, biometric data associated with the first personal identification device.

14. The non-transitory computer-readable medium of claim 13, the operations further comprising:
   receiving the biometric data associated with the first personal identification device from one of: the party, an electronic storage repository, or a persistent storage medium.

15. The non-transitory computer-readable medium of claim 13, the operations further comprising:
   storing the biometric data associated with the first personal identification device in the second personal identification device.

16. A system comprising a personal identification device having a memory coupled to at least one hardware processor, the memory comprising processor-executable instructions that, when executed by the at least one hardware processor, perform operations comprising:
   receiving, by the personal identification device, a signature associated with a biometric encryption key from a party, the signature having been decrypted by the party based on a private key associated with the party, wherein the biometric encryption key was previously split into a first section and a second section, the first section and second sections each encrypted using a different key;
   verifying, by the personal identification device, a validity of the signature based on a public key associated with a first personal identification device;
   decrypting, by the personal identification device, the encrypted first and second sections of the biometric encryption key; and
   combining, by the personal identification device, the decrypted first section of the biometric encryption key and the decrypted second section of the biometric encryption key to restore the biometric encryption key when the validity of the signature is verified.

17. The system of claim 16, wherein the second section of the biometric encryption key was decrypted by the party using the private key associated with the party.

18. The system of claim 16, wherein the first section of the biometric encryption key was decrypted using a passcode entered by a user.

19. The system of claim 18, wherein the passcode was entered by the user on a second personal identification device.

20. The system of claim 16, the operations further comprising:
   decrypting, by a second personal identification device, biometric data associated with the first personal identification device.

21. The system of claim 20, the operations further comprising:
   receiving the biometric data associated with the first personal identification device from one of: the party, an electronic storage repository, or a persistent storage medium.

22. The system of claim 20, the operations further comprising:
   storing the biometric data associated with the first personal identification device in the second personal identification device.

* * * * *